(12) United States Patent
Hall et al.

(10) Patent No.: US 11,300,303 B2
(45) Date of Patent: Apr. 12, 2022

(54) RADIANT PANEL WITH HEAT EXCHANGE DEVICE

(71) Applicant: Hall Labs LLC, Provo, UT (US)

(72) Inventors: David R Hall, Provo, UT (US); Arjun Krishna, Orem, UT (US); Benjamin Jensen, Orem, UT (US); Jeremy Johnson, Salem, UT (US); Justen Hansen, Stansbury Park, UT (US)

(73) Assignee: Hall Labs LLC, Provo, UT (US)

( * ) Notice: Subject to any disclaimer, the term of this patent is extended or adjusted under 35 U.S.C. 154(b) by 54 days.

(21) Appl. No.: 16/596,713

(22) Filed: Oct. 29, 2019

(65) Prior Publication Data

US 2021/0123617 A1 Apr. 29, 2021

(51) Int. Cl.
*F24F 5/00* (2006.01)
*F24D 3/14* (2006.01)
*F24F 1/0323* (2019.01)
*F24F 1/029* (2019.01)

(52) U.S. Cl.
CPC ............ *F24F 5/0089* (2013.01); *F24D 3/14* (2013.01); *F24F 1/029* (2019.02); *F24F 1/0323* (2019.02)

(58) Field of Classification Search
CPC ...... F24F 5/0089; F24F 1/0323; F24F 1/0314; F24F 1/029; F24F 1/022; F24F 1/027; F24F 1/031; F24D 3/12; F24D 3/14; F24D 3/16; F24D 3/18
See application file for complete search history.

(56) References Cited

U.S. PATENT DOCUMENTS

| | | | | |
|---|---|---|---|---|
| 4,766,951 A * | 8/1988 | Bergh | ..................... | F24D 3/165 165/56 |
| 4,898,153 A * | 2/1990 | Sherwood | ............... | F24S 10/73 126/665 |
| 2009/0031744 A1* | 2/2009 | D'Souza | ................. | F24F 1/027 62/262 |
| 2010/0198414 A1* | 8/2010 | Kroll | ......................... | F24D 3/14 700/278 |
| 2018/0195762 A1* | 7/2018 | Barrett | ..................... | F24H 9/06 |

* cited by examiner

*Primary Examiner* — Joseph F Trpisovsky

(57) ABSTRACT

The invention is an apparatus for heating or cooling a room of a building. The apparatus includes a radiant panel supported on a wall, which radiates energy to or from a room. The radiant panel has a conduit for passage of a fluid. The invention also includes a heat exchange device which heats or cools the fluid, which is installed inside the wall between two studs. A first line and second line connect the inlet and outlet to the heat exchange device. A pump that pumps the fluid that is heated or cooled by the heat exchange, whereby the room is heated or cooled depending on whether the fluid is heated or cooled by the heat exchange device.

13 Claims, 7 Drawing Sheets

RADIANT PANEL WITH HEAT EXCHANGE DEVICE

CROSS-REFERENCE TO RELATED APPLICATION

The present application is a Continuation-In-Part application of U.S. application Ser. No. 15/947,035, filed Apr. 6, 2018 and entitled "Hydronic Panel." The entire disclosure of the prior application is incorporated herein by reference.

TECHNICAL FIELD

The present invention relates to radiant heating and cooling devices.

BACKGROUND

Various solutions exist for heating and cooling spaces. Heating can be provided to a complete building, such as a residence, by a furnace that heats air, e.g. by combustion of a gas, which heated air is blown through vents into the building. Also, a boiler can heat water, oil, or other fluids, which circulate through pipes or radiators to heat rooms with radiant heat. Alternatively, electrical heaters can convert electricity to heat. Similarly, cooling can be provided with forced central air, chilled fluids that are pumped through pipes or radiators, and local electrical air conditioners.

Some radiant heating systems are standalone units. Others are installed in floors. Sometimes, they are also installed in walls and ceilings. Some more recent radiant heating systems use PEX (cross-linked polyethylene) pipes or other types of pipes that are placed throughout the floor, wall, or ceiling, and water circulates through the pipes to heat the surrounding space. However, when the pipes in which the water circulates cover a small portion of the surface area where they are installed, such radiant heating systems may result in slow or uneven heating, especially when objects such as couches, bookshelves, pictures, or clocks are placed in front of or over the top of the system. Furthermore, such systems can be difficult to construct, install, or repair.

SUMMARY

In a first aspect, the invention is an apparatus for heating or cooling a room of a building. The apparatus includes a radiant panel supported on a surface of a wall which radiates energy to or from a room. The radiant panel has a conduit for passage of a fluid. The invention also includes a heat exchange device which heats or cools the fluid, which is installed inside a wall. A first line and second line connect the inlet and outlet to the heat exchange device. A pump that pumps the fluid that is heated or cooled by the heat exchange device, whereby the room is heated or cooled depending on whether the fluid is heated or cooled by the heat exchange device.

In a second aspect, the invention is a kit for heating or cooling a room of a building with an exterior wall, including a radiant panel, a heat exchange device with an enclosure, a pump, a vent, and a power supply.

In a third aspect, the invention is a system for passing heat through a single exterior wall of a building including a pump for pumping a fluid through a closed-loop system which includes a radiant panel and a heat exchange device. The fluid flows from the heat exchange device, makes a first pass through an interior sheet of the exterior wall within the first line, flows through the radiant panel, makes a second pass through the interior sheet of the exterior wall within the second line, and back to the heat exchange device. The invention also includes an enclosure for the heat exchange device which is less than 14.75 inches wide and less than 5 inches deep. The enclosure also has a vent to allow air from outside to enter the enclosure and a fan for moving air through the vent.

Further aspects and embodiments are provided in the foregoing drawings, detailed description and claims.

BRIEF DESCRIPTION OF THE DRAWINGS

The following drawings are provided to illustrate certain embodiments described herein. The drawings are merely illustrative and are not intended to limit the scope of claimed inventions and are not intended to show every potential feature or embodiment of the claimed inventions. The drawings are not necessarily drawn to scale; in some instances, certain elements of the drawing may be enlarged with respect to other elements of the drawing for purposes of illustration.

DETAILED DESCRIPTION

Figure 1:
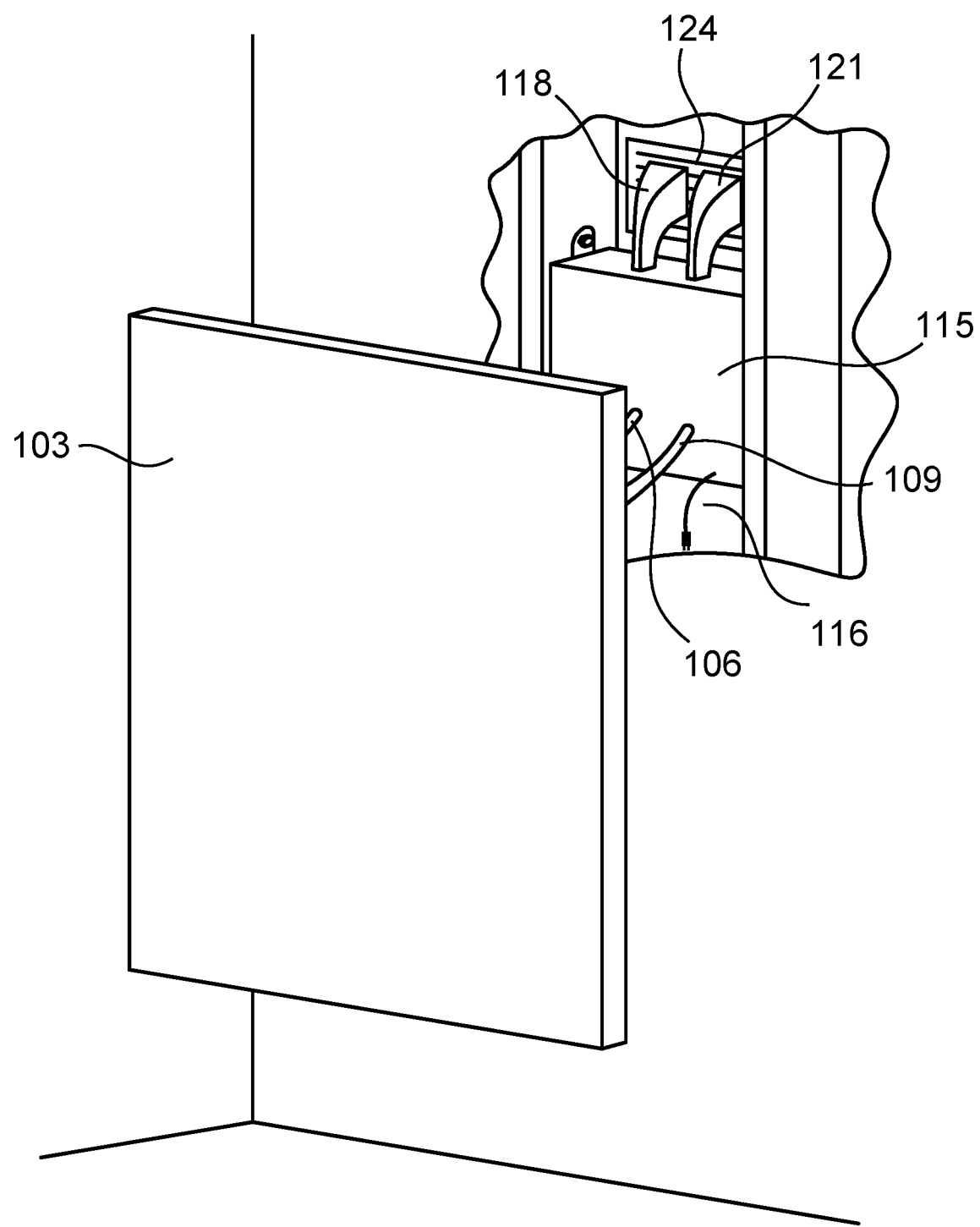
FIG. 1 is an exploded perspective view of a system for heating or cooling a room according to one embodiment of the invention including a transmission tube.

The following description recites various aspects and embodiments of the inventions disclosed herein. No particular embodiment is intended to define the scope of the invention. Rather, the embodiments provide non-limiting examples of various compositions, and methods that are included within the scope of the claimed inventions. The description is to be read from the perspective of one of ordinary skill in the art. Therefore, information that is well known to the ordinarily skilled artisan is not necessarily included.

Definitions

The following terms and phrases have the meanings indicated below, unless otherwise provided herein. This disclosure may employ other terms and phrases not expressly defined herein. Such other terms and phrases shall have the meanings that they would possess within the context of this disclosure to those of ordinary skill in the art. In some instances, a term or phrase may be defined in the singular or plural. In such instances, it is understood that any term in the singular may include its plural counterpart and vice versa, unless expressly indicated to the contrary.

As used herein, the singular forms "a," "an," and "the" include plural referents unless the context clearly dictates otherwise. For example, reference to "a substituent" encompasses a single substituent as well as two or more substituents, and the like.

As used herein, "for example," "for instance," "such as," or "including" are meant to introduce examples that further clarify more general subject matter. Unless otherwise expressly indicated, such examples are provided only as an aid for understanding embodiments illustrated in the present disclosure and are not meant to be limiting in any fashion. Nor do these phrases indicate any kind of preference for the disclosed embodiment.

As used herein, "contiguous," as in "contiguous channels," is generally meant to refer to the channels being separated by a common wall, although the key feature is that the channels are adjacent to each other.

As used herein, "heated," as in "heated water," is meant to refer to water that is above the ambient temperature of the room.

Likewise, as used herein, "cold" or "cooled," as in "cold water" or "cooled water," is meant to refer to water that is below the ambient temperature of the room.

As used herein, "radiant area" is defined as the total cross-sectional area of the heated or cooled fluid in the plane parallel to the surface of the wall. For example, if an array of circular pipes containing heated fluid was in a wall, the radiant area would be total length of pipe in the wall, times its diameter. Radiant area does not include transport piping or area of fluid outside the room being heated or cooled.

As used herein, "exchange medium" means matter which is an energy sink or an energy source depending on the needs of the system. For example, an exchange medium could comprise earth, air, water, refrigerant, etc. "Exchange medium" only refers to mediums of forced exchange rather than downstream uncontrolled energy exchange.

As used herein, a "closed-loop system" means a system of piping, channels, or other fluid containing tubular vessels which primarily reuses the same fluid rather than introducing new fluid during use of the system.

As used herein, the term "panel" is to be given a relatively broad meaning, referring to a component that has a depth smaller than the height and width. Preferably, the panels in this invention are flat and rectangular. Nevertheless, the panels may also be curved, bent, and have shapes other than rectangles. Panel may refer to one portion of a prebuilt wall, or it may refer to one portion of a wall that is built from scratch in place, or it may refer to a free-standing component.

As used herein, "thermal communication" refers to the exchange of energy between components, whether it be by conduction, convection, or radiation.

As used herein, "conduit" refers to a pathway for fluid to travel, whether it is traditional piping or the channels of twinwall or corrugated plastic.

As used herein, "heat exchange device" refers to a mechanism that exchanges energy from one medium to another, for example, a heat pump.

Radiant heating, as opposed to convective heating, is popular due to its quiet nature and the fact that it does not spread allergens. It can also be more efficient than convective heating because it does not require heating up the air of the building before a user can feel the warmth. Similarly, radiant cooling, although not as popular as radiant heating, is a quiet, efficient, and nondisruptive way to cool a building. Radiant panels can be configured to run in a cooling mode when cooler temperatures are desired and a heating mode when warmer temperatures are desired.

Radiation is the transferring of electromagnetic energy in the form of infrared rays from one surface to the other surfaces around it. The amount of energy transferred depends on the both the temperature and area of the surface. A higher temperature and a larger surface area will increase heat transfer. Therefore, it is beneficial to increase the temperature and the surface area of a radiant heater. Or conversely, increasing the surface area can allow a radiant heater to operate at cooler temperatures, which may be useful when a source of heat is not hot enough to operate with a smaller surface area. It also can be safer. Similarly, a larger area for a radiative cooler can absorb more energy from the room as the objects in the room radiate to it, helping the room to cool down more quickly.

However, radiant panels are difficult to install into a building or home after it is built. This is because the fluid running through the panel is usually piped to a heating or cooling source distant to the panel. Many radiant panels receive heated or cooled water from a boiler in a basement, a geothermal heat exchanger outside, or a heat pump at a distant location from the panel. Each of these setups can be extremely difficult to install after the building is complete.

Further, because the piping for radiant heating or cooling typically runs through a whole building, it can be difficult to give special attention to problem spots, such as hot sunny areas or cold drafty areas. Many times, a single thermostat controls the system for an entire house or for an entire section of a building. Small changes in air flow or sunlight can cause neighboring rooms to have vastly different temperatures. What is needed is a way to heat or cool a building with radiant panels that allows each room to be controlled individually.

Finally, radiant heating and cooling typically suffers from energy losses from the piping between the panel and the source of water. When the mechanism heating or cooling the water is located far away from the radiant panel, the piping absorbs or loses heat to the air around the piping during transfer. As piping length increases, the system gets more inefficient. Further, as piping length increases, the more friction the fluid has with the pipe wall, which requires more pumping energy, making the system even more inefficient. Therefore, energy can be saved by making the piping as short as possible.

The invention includes a heat pump coupled to a radiant panel which allows energy to be exchanged between a room and the outside air directly behind a radiant panel. This allows a user to add radiant panels with much less time, material, and cost of adding radiant panels the traditional way. It also allows problem rooms with hot spots or cold spots to be fixed without overheating or overcooling the entire building. Further, it minimizes the distance a fluid travels from the time it is heated or cooled to the time it flows through the panel. This minimizes both heat loss and friction in the piping.

In one embodiment of the invention, a radiant panel is disposed on the inside of an exterior wall of a building. A heat pump is placed within the wall behind the radiant panel. A vent may be in the exterior wall behind or near the heat pump so air can be exchanged with the heat pump and outside the building.

A heat pump located in the wall is a way for the radiant panel to be in a close proximity to a source of heated or cooled fluid. For reasons previously discussed, the closer the source of heated or cooled water is to the radiant panel, the better. In one embodiment of the invention, the tubing that connects the radiant panel and the heat pump is less than ten feet. In another embodiment of the invention, the length is less than five feet. In yet another embodiment of the invention, the length is less than two feet. In yet another embodiment of the invention, the radiant panel connects directly to the heat pump.

The radiant panel itself may come in many configurations. It can be many different sizes and shapes and be made from different materials. Some configurations, such as a traditional pex or pvc water pipe in serpentine fashion provide less radiant area, but may be suitable for some applications. Other configurations, as discussed below provide much more radiant area. Further, the panel may contain additional layers of such things as insulation and foil to aid heat transfer to the room.

In one embodiment of the present invention, the area of a radiant heater or cooler is maximized by running heated or cooled fluid through a panel made primarily of channels for fluid. One example is an extruded plastic panel of rectangle channels commonly called "corrugated plastic" or "twinwall." The channels may be contiguous such that each channel shares a wall, or partition, with an adjacent channel. This way, most or all of the area of the panel is radiant area. This provides much more radiant area than a panel or wall with traditional pipes running through it. It also minimizes leaking and maintenance because fluid from a leaky channel may go into the adjacent channel. In some embodiments, the radiant area is preferably greater than 20% of the panel. Even more preferably, the radiant area is greater than 50% of the panel. Even more preferably, the radiant area is more than 90% of the panel. The greater the radiant area is, the smaller the heat differential between the heating or cooling fluid and the room needs to be.

Although the radiant area of the panel is maximized by using corrugated plastic, radiant panels may be made by other means as well. For example, they may be made with a pipe, such as PVC, PEX, or metal winding back and forth across the panel in a serpentine configuration. These typically are much thicker and heavier than corrugated plastic, in addition to giving or receiving less radiative energy.

The fluid used in the system to transfer energy into or out of the room could be any fluid that is not harmful to the system, including gases or liquids. Liquids, such as water, have many ideal characteristics, such as high emissivity, high specific heat, and low cost. However, water tends to allow growth of organisms and has the potential of freezing. Glycols, such as ethylene glycol or propylene glycol, are commonly added to water to lower the freezing point and prevent growth of organisms. However, glycol reduces the specific heat of the mixture, so more volume is required through the system than with water alone. There are many glycols which share similar physical properties and are suitable for use in the invention, but the preferred embodiment typically uses a mixture of water and propylene glycol because it is non-toxic and safer if there is a leak or spill. Preferably, the fluid is a water mixture with 20% to 45% glycol. Even more preferably, the fluid is a water mixture with 25% to 40% glycol. Even more preferably, the fluid is a water mixture with 30% to 32% glycol. In other embodiments, the fluid contains oil, such as diathermic oil, which has the additional benefit of remaining a liquid at higher temperatures than water.

Figure 7:
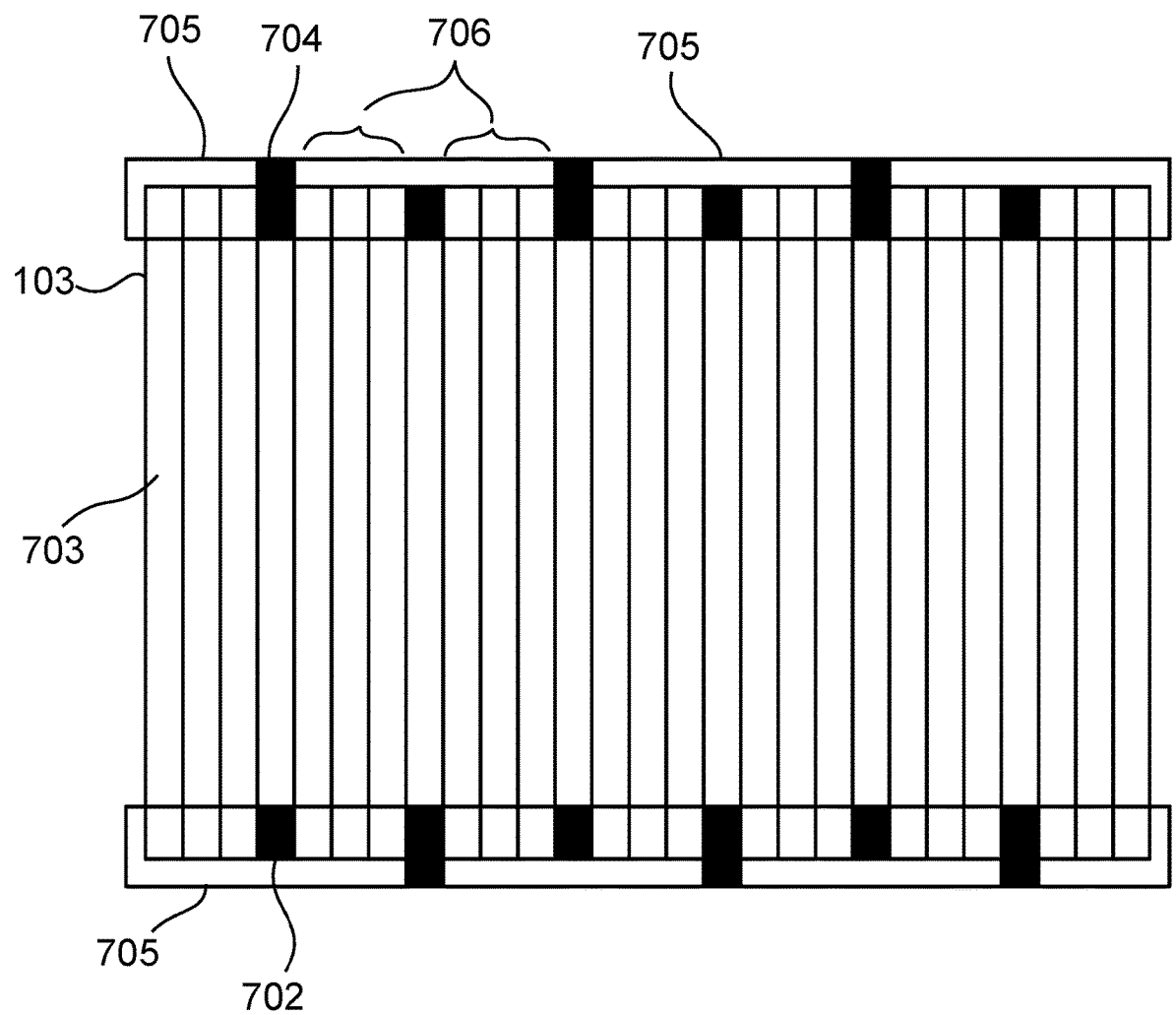
FIG. 7 is a front view of one embodiment of the invention wherein the channels are grouped into zones with the use of plugs.

In a preferred embodiment, the friction in a radiant panel made from corrugated plastic is reduced by dividing it into zones rather than alternating the fluid up and down each adjacent channel. In one embodiment, zones are created by putting notches in the end of the partitions dividing the channels. This way, fluid is able to flow freely across the notches and then down the channels to the other side where it is directed to an adjacent zone. See FIG. 7 for an example. Another way is with an endcap placed over an open end of a panel that puts some channels in communication with each other while blocking off others. In that configuration, there may be an opposing and corresponding endcap configured to provide the same zones as depicted in FIG. 7.

The invention also provides flexible installation options, including covering options. In one embodiment, the panel includes a finishable surface, such as the fibrous surface of drywall. In other embodiments, the panel includes a decorative surface, such as a wallpaper, paint, or a canvas with a printed image. These options will help to make the panel's appearance unnoticeable or stand out, as desired. The decorative covering preferably also has a low thermal conductivity but a high emissivity, such as a velvet wallpaper, to make the wall cooler to the touch while still warming the room through radiation.

In other embodiments, the panel has a layer of insulation, typically on the back side, either to reduce heat transfer toward the wall or to reduce noise from the outside, or both. Insulation could be traditional fiberglass or foamboard, or it could comprise a second channel layer configured to insulate. In one embodiment, one or more additional channel layers, preferably made of twinwall, may be used and is filled with sound damping material such as soil or barite. In other embodiments, additional channel layers may be used with a layer of air to discourage sound vibrations and heat transfer.

One embodiment of the invention utilizes multiple channel layers configured to aid insulation, noise reduction, or reduce condensation by creating a vacuum in one of the layers. This is possible by using multiple sheets of extruded material which are placed adjacent to each other or a single panel of extruded material which has multiple channel layers within it. Channels of air make great insulators, but channels with a vacuum are better because there is no convection or conduction through an empty space. One embodiment of the invention has a single panel with three channel layers, as depicted in FIG. 5. Cooled or heated fluid may run through the layer closest to the room to deliver heat to the room, and the middle or rear layer would have a vacuum. The third layer may also have a vacuum, or it could be filled with air or an insulator, such as barite, or it could be a second fluid-containing layer. In the preferred embodiment of this configuration, the vacuum layer is on the front and the fluid-containing layer is in the middle or back. This could drive radiation as the main heat transfer mechanism. In some cases, this may help with condensation on the front of the wall, especially during cooling. This is because the temperature of the front of the panel will be somewhere between the temperatures of the fluid layer and the room, especially if its temperature is closer to room temperature.

The invention can be versatilely installed onto the wall of a building. It can be configured to be retrofit into established buildings, or it can be installed into new buildings. In one embodiment, it can be supported by the wall with hanging hardware. In another, it can replace drywall and be supported by a support structure, such as wooden studs. In one embodiment of the invention, a single panel is installed in a room. In other embodiments, more than one panel can be connected with fluid communication between the panels, which will increase the radiant area.

Another embodiment of the invention uses a reflective layer disposed within the panel to help direct heat transfer in a particular direction. Materials with very low emissivity, such as aluminum, brass, chromium, or silver, among others, may be placed on the back side of the panel in order to reduce radiation toward the exterior wall. In the preferred embodiment, a reflective layer will have an emissivity lower than 0.1 and be economically sourced, such as aluminum foil with an emissivity of 0.04.

The heat exchange device may also take various forms. It may only provide either heated or cooled fluid, or it may have a reversing valve and be able to provide heated and cooled fluid, depending on the mode. It may also take different shapes and sizes. Further, it may be configured to heat or cool only one type of fluid, such as a liquid like water and/or glycol, or it may be able to heat or cool air in addition to a liquid. The heat exchange device may include a vent to the outside air either directly behind it or at another location. The vent may be covered or disguised so it is aesthetic or not noticeable from an outside viewer.

The heat exchange device comprises an enclosure that enables it to fit substantially within the wall of a building. In the preferred embodiment, the enclosure is 14-14.5" wide so it may be easily supported by a stud on each side. In other embodiments, the enclosure is smaller, and uses adjustable brackets which take up the remaining space between two studs. In yet additional embodiments, the enclosure is supported by cross bars which mount between two studs, allowing the enclosure to be smaller. In yet additional embodiments, the enclosure is supported by an interior and/or exterior sheet of exterior wall, such as drywall or a sheet of wood. The preferred embodiment, the wall is an exterior wall, so the energy from the room may be exchanged with air exterior to the building, however, the invention may be used strategically in an inner wall if there is enough of a heat sink available to provide or absorb heat to or from the room being heated or cooled.

In one embodiment of the invention, the enclosure fits substantially within the wall, meaning less than half of the enclosure protrudes from the front of the wall. In another embodiment, the enclosure is completely behind the front surface of the wall. In yet another embodiment, the enclosure fits behind the front surface of the wall except for a brim designed to cover the cut portion of the wall and/or a front cover plate.

The enclosure may also contain other characteristics which make it suitable to be installed within a wall. For example, it may contain vents in one or more of its walls to allow air to enter and exit the enclosure. In the preferred embodiment, one or more vents are in the back side of the enclosure so air can be vented directly through a hole in the building wall and into the enclosure without the need for additional air ducts. This also makes it easier to cut the hole in the external layer of the external wall for venting because it overlaps with the hole in the internal layer of the external wall. The enclosure may also contain one or more holes in the front cover to allow pipes for the fluid from the radiant panel to enter the enclosure.

Figure 4:
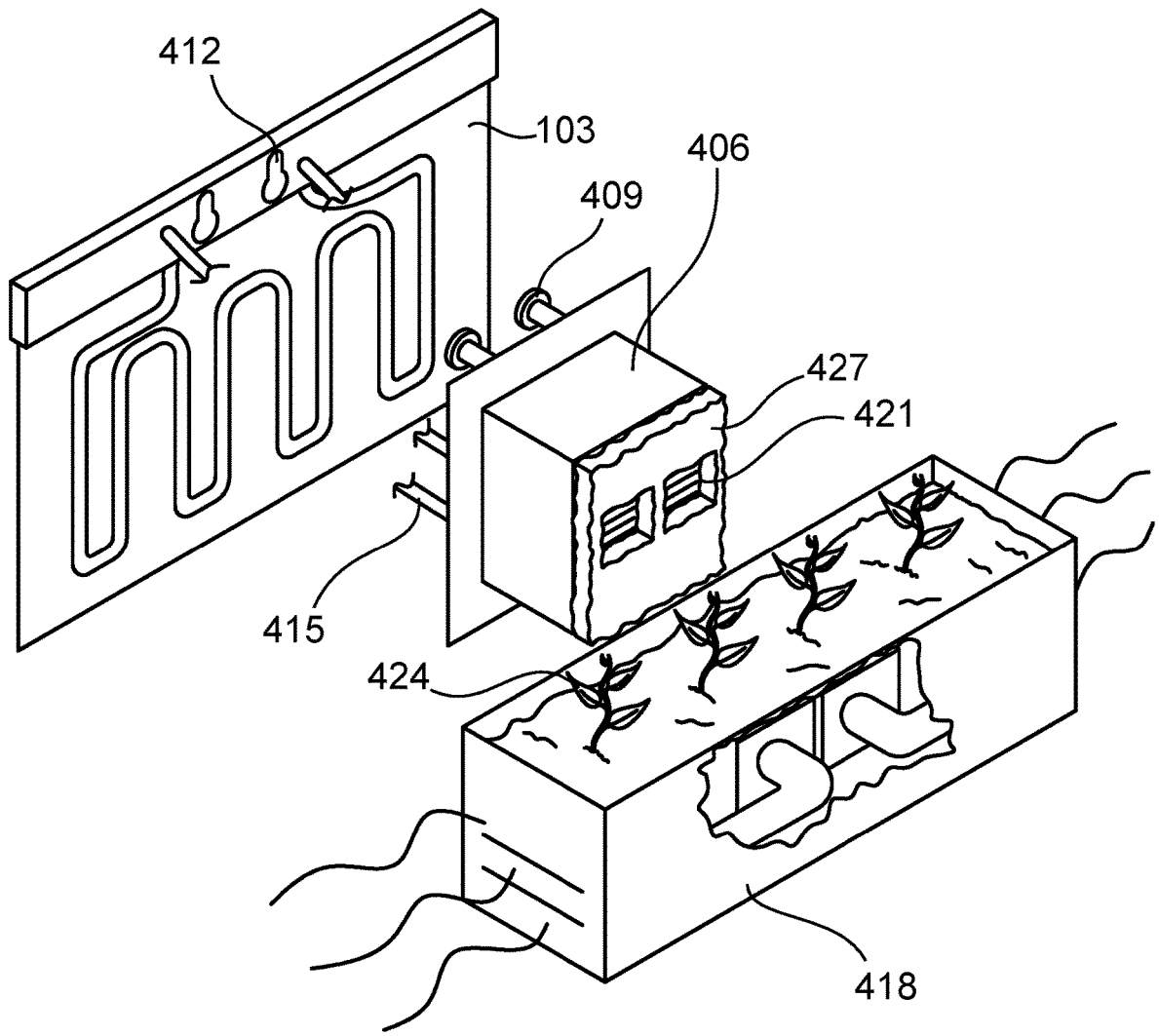
FIG. 4 is a rear exploded perspective view of a system for heating or cooling a room.

The enclosure may also be used as a means to mount the radiant panel. It may comprise hooks protruding from the front of the enclosure into the room, which may mate with receiving support structures on the panel, as shown in FIG. 4.

In one embodiment of the invention, the heat exchange device is a heat pump. The heat exchange may take place at a condenser or an evaporator within the heat pump. In one embodiment, the heat pump contains a reversing valve, which allows it to provide heat to the radiant panel while in a heating mode and to receive heat from the radiant panel while in a cooling mode.

In another embodiment of the invention, the heat exchange device is a heat pump with an additional blower, or fan, to provide air to the room being heated or cooled. The blower may blow air over an evaporator or a condenser to heat or cool the air prior to flowing into the room. In another embodiment, the air is blown directly along the back side of the radiant panel to heat or cool the air before dispersing into the rest of the room. One variant of this embodiment is that the air received by the blower is recycled from the room, directed through the heat exchange device, and back to the room. Another variant is that fresh air is received from outside. Naturally, the ability to bring fresh air from outside or to exhaust stale air from inside can be an advantage of this embodiment.

Now referring to FIG. 1, which shows an exploded view of one embodiment of the invention. A radiant panel 103 has an inlet pipe 106 and an outlet pipe 109. The pipes connect to a heat exchange device 115. In this configuration, the heat exchange device receives power from an electrical plug 116, which is plugged in inside the building. The heat exchange device 115 includes an air inlet 118 and an air outlet 121, which put the heat exchange device in communication with a vent 124, which vents to the exterior of the building.

Figure 2:
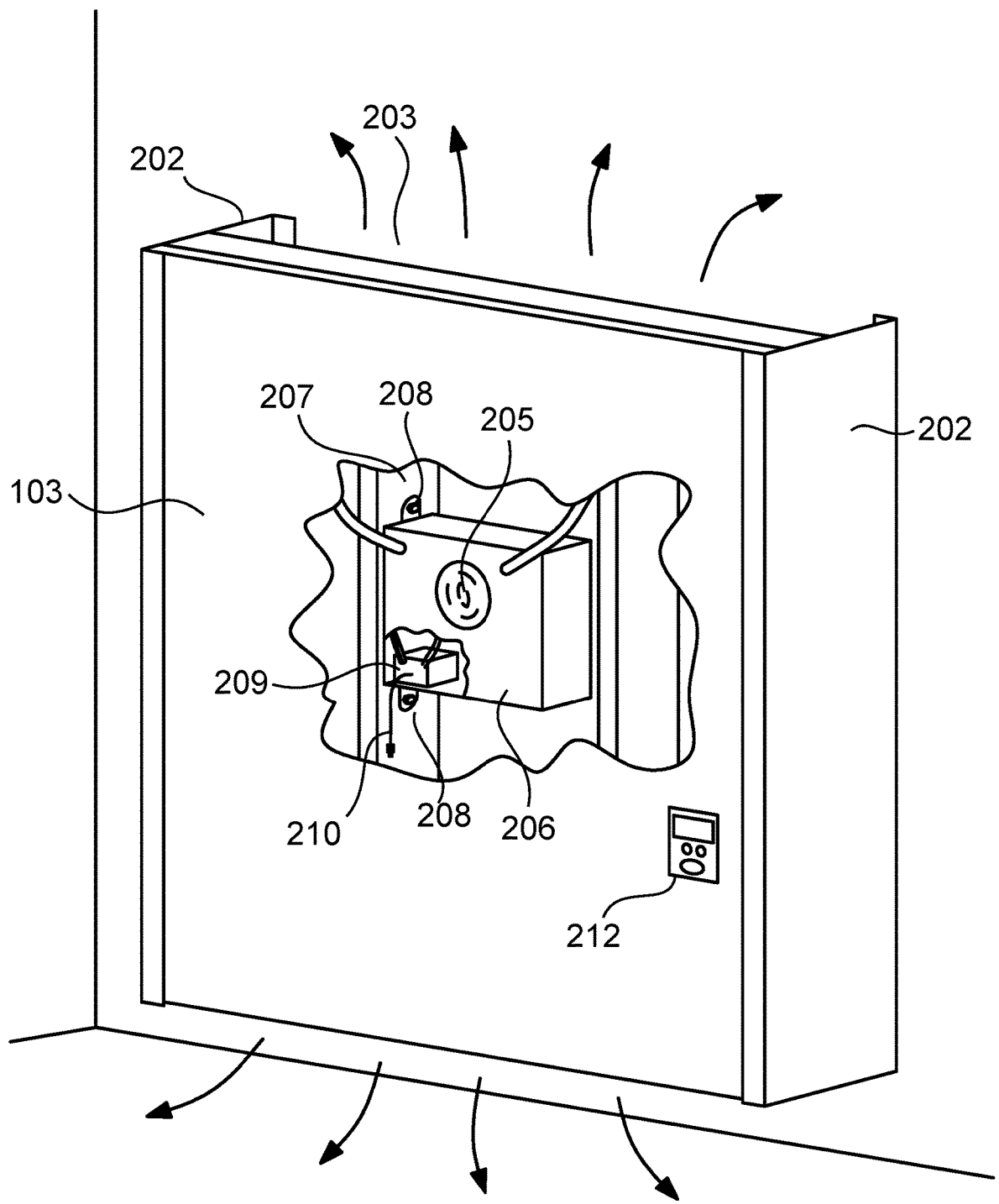
FIG. 2 is a perspective view of one embodiment of the invention including spacing elements.

Now referring to FIG. 2, a heating or cooling system is depicted with a gap between a radiant panel and a wall to allow airflow. A radiant panel 103 is attached to a wall with two mounting brackets 202. The mounting brackets 202 are also spacers which create an air-channel 203 between the wall and the panel 103. A blower 205 may help air flow and energy transfer to or from the room as well as help remove condensation from the panel. As depicted, the blower 205 brings air in from outside the building. In another embodiment of the invention, air may also be recycled from inside the room, entering the air-channel from one side, passing behind the radiant panel, and exiting from another side. In one embodiment of the invention, the mounting brackets set the panel from the wall at small distance, such as $\frac{1}{16}$" in order to maximize heat transfer with the air. In other embodiments, the distance is greater, such as 3"-6", depending on air flow, in order to make the air flow more quietly. An enclosure for an in-wall heat exchange device 206 lies behind the panel and within the wall and is attached to a stud 207 with two mounting brackets 208. A power supply 209 receives electricity from an electrical cord 210, and supplies electricity to the components of the heat exchange device, the blower 205, and other components, such as a pump for the fluid in the radiant panel (not shown), through electrical wires 211. The power supply may also supply electricity to a control panel 212, which may control system.

Figure 3:
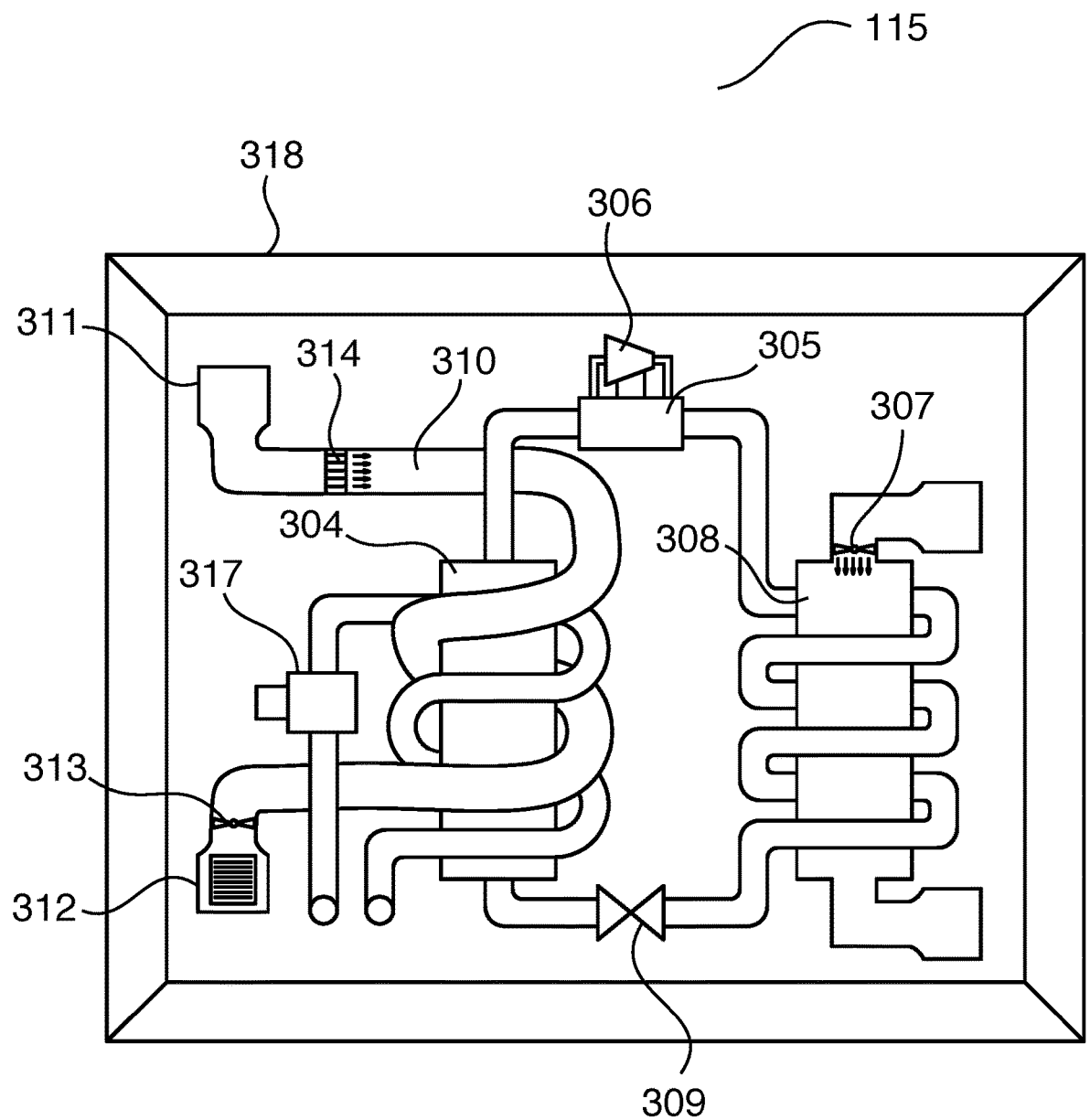
FIG. 3 is an elevation view of embodiment of the invention including a heat pump.

Now referring to FIG. 3, which is an embodiment of the heat exchange device used with the invention. A heat pump 115 is within the wall of a room with a radiant panel (not shown). The fluid in a radiant panel enters the enclosure 318 through an inlet, exchanges energy with the heat pump 115 through a heat exchanger 304, which may contain a refrigerant, and exits the enclosure through an outlet. The heat exchanger 304 may be a condenser or an evaporator depending on whether the system is heating or cooling the room. The fluid from the radiant panel is moved by a pump 317. The heat pump also contains a reversing valve 305, a compressor 306, and an expansion valve 309. A fan 307 blows air through another heat exchanger 308, which also may be a condenser or an evaporator depending on the mode of the system. This embodiment also includes an additional air tube 310 for bringing fresh air into the house, with inlet 311 and outlet 312. The air tube is in thermal communication with heat exchanger 304, so air may be heated or cooled prior to entering the room through outlet 312. A fan 313 moves the air and a filter 314 cleans the air prior to entering the room. This embodiment also includes a brim which will cover the edges of a hole cut in the wall in which the enclosure is installed.

Now referring to FIG. 4. Another embodiment of the invention includes a radiant panel 103 and an in-wall heat exchange device within an enclosure 406. The enclosure 406 includes mounting hardware 409 for hanging the radiant panel 103. The radiant panel 103 includes mounting slots 412 which receive the mounting hardware 409, although the panel may be hung or rested against the wall in other fashions. Fluid lines 415 connect the radiant panel 103 and a heat pump inside the enclosure 418. A decorative cover 424 hides any holes which must be cut in the building (not shown). Air vents 421 allow a stream of air with which to exchange energy enter the enclosure of the heat exchange device 406. The decorative cover 424 in the depicted embodiment also connects to the air vents 421 and diverts the two air streams away from each other. A layer of insulation 427 lines the back side of the enclosure 406.

Figure 5A:
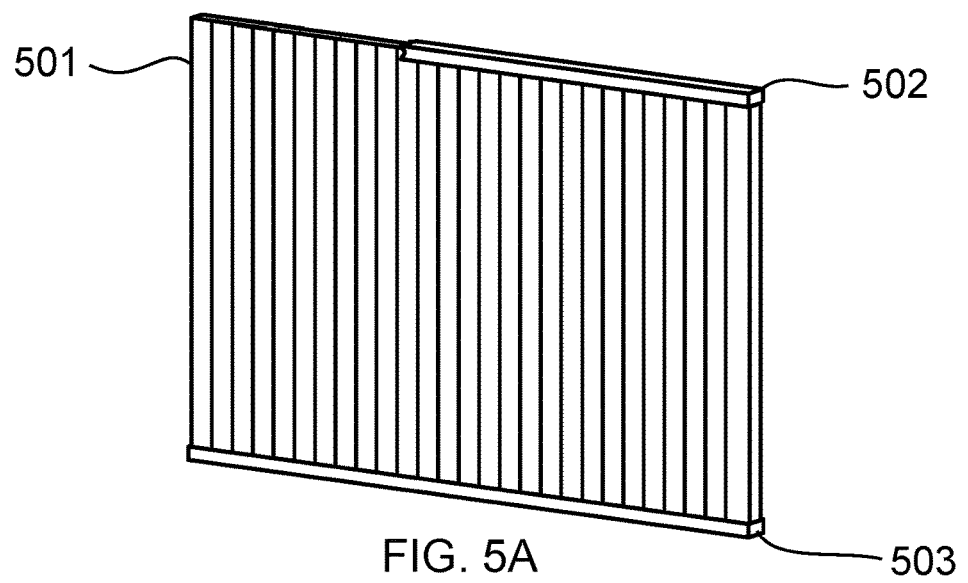
FIGS. 5a-5c are perspective views of embodiments of the invention using various layers of channels.
Figure 5B:
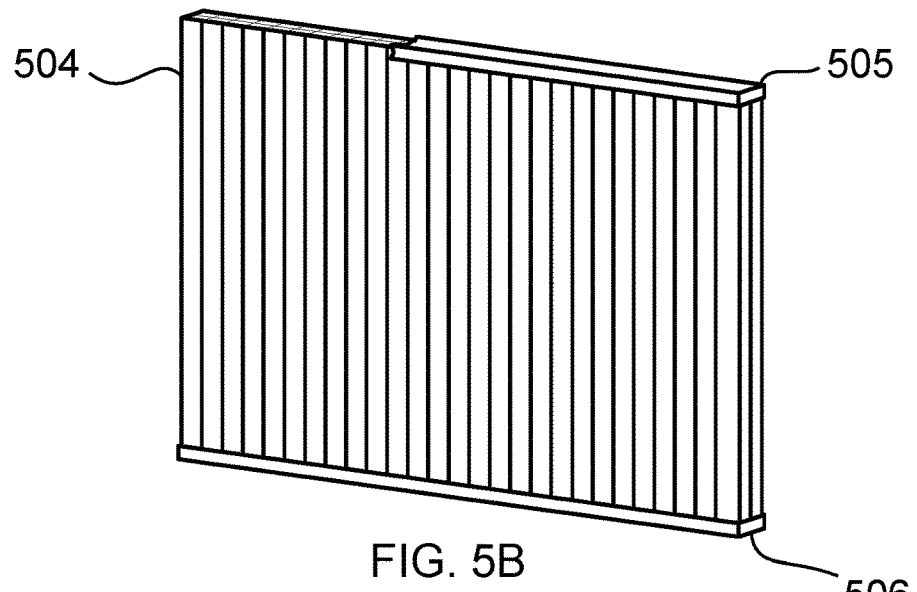
Figure 5C:
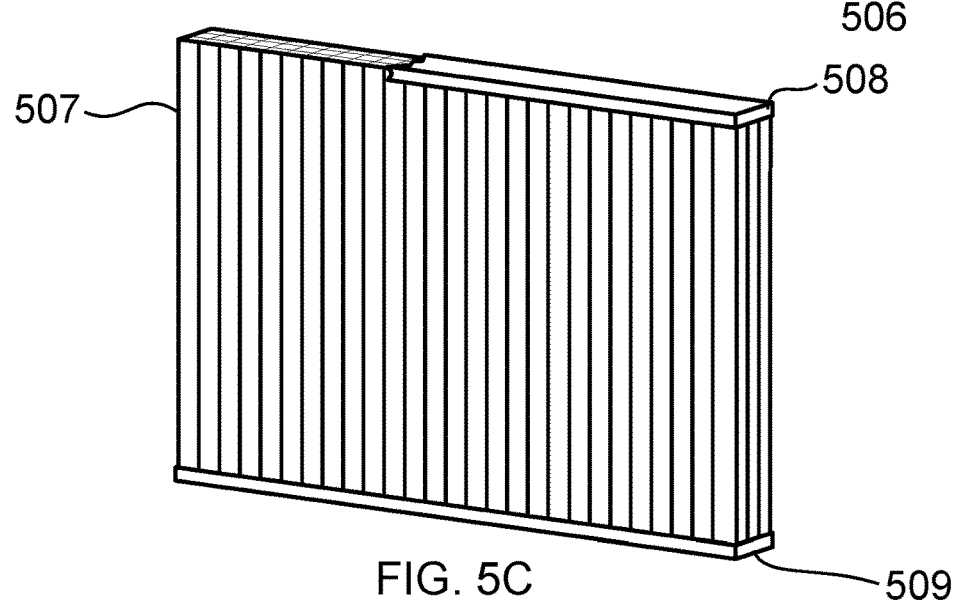

Now referring to FIG. 5, which shows multiple embodiments of a radiant panel. FIG. 5A shows a radiant panel with a single row of channels 501. Endcaps 502 and 503 keep fluid from escaping the panel. FIG. 5B shows a radiant panel with two rows of channels 504. Endcaps 505 and 506 keep fluid from escaping the panel. FIG. 5C shows a radiant panel with three rows of channels 507. Endcaps 508 and 509 keep fluid from escaping the panel.

Figure 6:
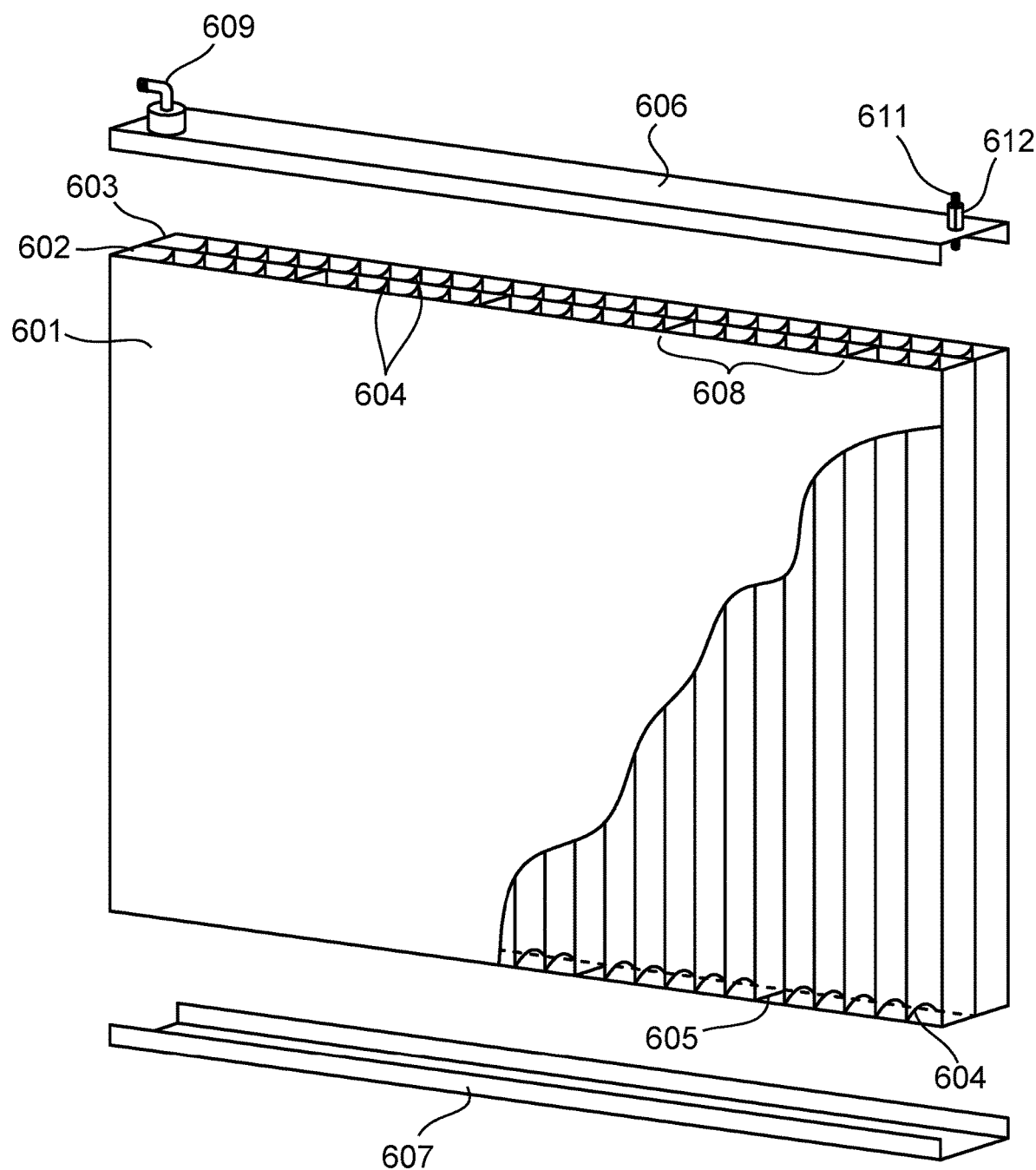
FIG. 6 is a perspective view of one embodiment of the invention including a vacuum layer.

Now referring to FIG. 6, which shows an embodiment of the invention with a vacuum layer. A radiant panel 601 has two rows of channels, each comprising a different layer of the panel: a fluid layer 602 and a vacuum layer 603. Some of the partitions of the fluid layer have a notch 604 allowing fluid to flow between them, while others extend to the end of the channel 605 to form a barrier between the partition and the endcaps 606 and 607. This allows a fluid to flow in the same direction through multiple channels, or zones 608. In this embodiment, the vacuum layer does not have any zones. A fluid inlet 609 and outlet (not shown) is on endcap 606. A vacuum nozzle 611 with check valve 612 is mounted on endcap 606 on the side of the vacuum layer, which allows air to be removed from the vacuum layer without reentering.

Now referring to FIG. 7, which shows one embodiment of the invention using plugs to create zones. A radiant panel 103 is shown in a serpentine configuration. Smaller plugs 702 prevent fluid from entering a channel 703, while larger plugs 704 prevent fluid from entering a channel and also passing through the endcaps 705. Zones 706 are created, in this case, each with three channels. The small and large plugs are offset such that fluid flows from side to side in a serpentine configuration through the panel. In this configuration, the endcaps 705 create manifold areas 706 that redirect the fluid back into the channels in contrast to FIG. 6, which uses notches within the channels to do this.

All patents and published patent applications referred to herein are incorporated herein by reference. The invention has been described with reference to various specific and preferred embodiments and techniques. Nevertheless, it is understood that many variations and modifications may be made while remaining within the spirit and scope of the invention.

What is claimed is:

1. An apparatus for heating or cooling a room of a building with a wall, the wall comprising an inner sheet facing the room and an outer sheet facing away from the room, the apparatus comprising:
    a radiant panel adapted to be supported on the wall, the radiant panel comprising:
        a first side adapted to face the wall;
        a second side which faces away from the wall and is adapted to radiate energy to or from a room;
        a fluid conduit configured for passage of a fluid;
        an inlet through which the fluid enters the radiant panel; and
        an outlet through which the fluid exits the radiant panel;
    a heat exchange device configured to heat or cool the fluid and adapted to be disposed substantially inside the wall;
    a first line connecting the inlet to the heat exchange device;
    a second line connecting the outlet to the heat exchange device;
    a pump that pumps the fluid that is heated or cooled by the heat exchange device through the first line, through the inlet, through the fluid conduit, through the outlet, and through the second line back to the heat exchange device, whereby the room is heated or cooled depending on whether the fluid is heated or cooled by the heat exchange device;
    spacing elements that set the radiant panel away from the interior sheet;
    a first air duct for bringing air from external to the building into the heat exchange device;
    a second air duct for directing air from the heat exchange device to the outside of the building; and
    a vent, whereby the heat exchange device exchanges energy from the room to the air external to the room through the vent; and
    wherein the radiant panel is adapted to be supported on the wall;
    wherein the heat exchange device is adapted to be mounted between two studs located between the inner sheet and the outer sheet.

2. The apparatus of claim 1 wherein the wall is an external wall and the radiant panel is adapted to be supported on the external wall.

3. The apparatus of claim 1 wherein the fluid conduit comprises contiguous channels formed from a sheet of extruded plastic and wherein individual channels within the sheet of extruded plastic are united into zones.

4. The apparatus of claim 2, wherein the heat exchange device is configured to fit within a hole in the inner sheet; wherein the vent is in the outer sheet;
    and wherein the hole and the vent at least partially overlap.

5. The apparatus of claim 4 further comprising a decorative cover disposed on the vent.

6. The apparatus of claim 1 further comprising:
    a blower, wherein the blower moves air over the first side of the radiant panel in order to heat or cool the air before it is dispersed into the room.

7. The apparatus of claim 6 wherein the spacing elements create a rectangular duct; wherein the duct is defined on two sides by the spacing elements, on a third side by the wall, and on a fourth side by the first side of the radiant panel.

8. The apparatus of claim 1 further comprising an enclosure for the heat exchange device.

9. The apparatus of claim 8 wherein the pump is inside the enclosure.

10. The apparatus of claim 8 wherein the enclosure further comprises an insulative layer on an external side of the enclosure.

11. The apparatus of claim 8 wherein the enclosure comprises two opposing side walls, each of which are less than 4 inches wide, and wherein the side walls are between 14 inches and 14.5 inches apart from each other.

12. The apparatus of claim 11 wherein the enclosure comprises mounting hardware configured to mount the radiant panel to the two wooden studs.

13. The apparatus of claim 1 wherein the heat exchange device is less than 14.75 inches wide and less than 5 inches deep.

\* \* \* \* \*